United States Patent
Enickl (10) Patent No.: US 10,514,316 B2
(45) Date of Patent: Dec. 24, 2019

(54) DIAGNOSTIC APPARATUS AND TESTING METHOD

(71) Applicant: DELAVAL HOLDING AB, Tumba (SE)

(72) Inventor: Joergen Enickl, Tumba (SE)

(73) Assignee: DeLaval Holding AB, Tumba (SE)

( * ) Notice: Subject to any disclaimer, the term of this patent is extended or adjusted under 35 U.S.C. 154(b) by 185 days.

(21) Appl. No.: 15/754,238

(22) PCT Filed: Oct. 5, 2016

(86) PCT No.: PCT/SE2016/050943
§ 371 (c)(1),
(2) Date: Feb. 21, 2018

(87) PCT Pub. No.: WO2017/061932
PCT Pub. Date: Apr. 13, 2017

(65) Prior Publication Data
US 2018/0246005 A1    Aug. 30, 2018

(30) Foreign Application Priority Data
Oct. 8, 2015    (SE) ...................... 1551291

(51) Int. Cl.
*G01M 3/26* (2006.01)
*A01J 7/00* (2006.01)
(Continued)

(52) U.S. Cl.
CPC ................ *G01M 3/26* (2013.01); *A01J 5/08* (2013.01); *A01J 7/00* (2013.01); *A01J 5/06* (2013.01)

(58) Field of Classification Search
CPC ...... A01J 5/06; A01J 5/08; A01J 7/00; G01M 3/26
See application file for complete search history.

(56) References Cited

U.S. PATENT DOCUMENTS

| 3,589,194 A | 6/1971 | Noorlander |
| 5,178,095 A * | 1/1993 | Mein ................... A01J 5/007 119/14.02 |

(Continued)

FOREIGN PATENT DOCUMENTS

| AU | 2584667 A | * | 2/1970 | ............ A01J 5/017 |
| AU | 3322884 A | * | 4/1985 | ............ A01J 5/0133 |

(Continued)

OTHER PUBLICATIONS

International-Type Search Report, dated May 13, 2016, from corresponding priority national application No. 1551291-6.

(Continued)

*Primary Examiner* — Francis C Gray
(74) *Attorney, Agent, or Firm* — Young & Thompson (57) ABSTRACT

A diagnostic apparatus for testing a milking point of a milking machine includes sensors for measuring fluid-transport related parameters, including various pressure levels and/or flow values relating to a set of teatcups includes a controllable valve and a set of test tubes. Each test tube is configured to be attached to one teatcup, where the controllable valve selectively arranges a particular one of the test tubes for measurement of at least one parameter via one of the sensors in response to a control signal. The measurements are performed while all the teatcups are simultaneously attached to the test tubes and an external vacuum pressure is applied either on a milk-line side of the controllable valve or on a side opposite to the milk-line side relative to the controllable valve.

20 Claims, 5 Drawing Sheets

(51) Int. Cl.
*A01J 5/08* (2006.01)
*A01J 5/06* (2006.01)

(56) References Cited

U.S. PATENT DOCUMENTS

| | | | | |
|---|---|---|---|---|
| 5,218,924 | A | * | 6/1993 | Thompson .............. A01J 5/007 119/14.02 |
| 5,570,870 | A | | 11/1996 | Bilgery |
| 5,697,325 | A | * | 12/1997 | Gehm ..................... A01J 5/007 119/14.28 |
| 6,038,030 | A | * | 3/2000 | van den Berg ....... A01J 5/0131 119/14.08 |
| 6,866,003 | B2 | | 3/2005 | Schulze-Wartenhorst |
| 7,957,920 | B2 | * | 6/2011 | Innings .................. A01J 5/007 702/51 |
| 2003/0051668 | A1 | * | 3/2003 | Watanabe ................ A01J 5/00 119/14.44 |
| 2009/0078206 | A1 | * | 3/2009 | Watanabe ............. A01J 5/0175 119/14.1 |
| 2009/0177418 | A1 | | 7/2009 | Innings et al. |
| 2016/0302377 | A1 | * | 10/2016 | Hayes ..................... A01J 5/007 |

FOREIGN PATENT DOCUMENTS

| | | |
|---|---|---|
| DE | 19802887 A1 | 7/1999 |
| GB | 996854 A | 6/1965 |
| GB | 1237316 A | 6/1971 |
| SU | 1412671 A1 | 7/1988 |
| WO | 01/32004 A1 | 5/2001 |
| WO | 03/009675 A1 | 2/2003 |
| WO | 2007/100280 A1 | 9/2007 |

OTHER PUBLICATIONS

International Search Report, dated Jan. 19, 2017, from corresponding PCT application No. PCT/SE2016/050943.

* cited by examiner

DIAGNOSTIC APPARATUS AND TESTING METHOD

THE BACKGROUND OF THE INVENTION AND PRIOR ART

The present invention relates generally to testing of milking apparatuses. More particularly the invention relates to a diagnostic apparatus according to the preamble of claim 1 and a method of testing executed via this apparatus. The invention also relates to a computer program and a processor-readable medium.

Today's milk production units for extracting milk from cows, buffaloes, goats, sheep and the like are highly efficient in terms of extracted milk volume per animal. However, since the milking equipment may be relatively expensive, it is key to minimize the downtime due to testing and service. Therefore, it is desirable that any scheduled testing of a milking machine can be effected in the most efficient way.

Some testing can be carried out during normal operation of the milking machine, so-called wet or dynamic testing. WO 2007/100280 shows one example of such testing, which, of course, is advantageous from a utilization point-of view.

However, other types of test may require that the equipment is temporarily shut down, for example tests investigating the function of the teatcups. WO 01/32004 describes an apparatus, which includes one or more artificial teats for introduction into a respective teatcup under test. Here, the artificial teat has a collapsible chamber for analyzing the pulsation pressure waveform exerted by the teatcup when operating.

Problems Associated with the Prior Art

Although there exist diagnostic equipment for testing various parameters of a milking apparatus there is still room for improving the efficiency of automatic dry testing of the fluid tightness, the vacuum levels and/or the flow capacity of a milking machine.

SUMMARY OF THE INVENTION

The object of the present invention is therefore to solve the above problem, and offer efficient dry testing of a milking point, i.e. diagnosing the function of the teacups and their interfaces towards the milking machine.

According to one aspect of the invention, the object is achieved by the initially described diagnostic apparatus, wherein the apparatus further includes at least one sensor, a set of test tubes and a controllable valve. The at least one sensor is configured to measure at least one fluid-transport related parameter of the milking point, e.g. a pressure level and/or a flow value. Each test tube in the set of test tubes is configured to be attached to one teatcup, and the controllable valve is further connected to each of the test tubes. In response to a control signal, the controllable valve is configured to selectively arrange a particular one of the test tubes for measurement of the at least one fluid-transport related parameter by means of the at least one sensor while the teatcups are simultaneously attached to the test tubes and an external vacuum pressure is applied, either on a milk-line side of the controllable valve or on a side opposite to the milk-line side relative to the controllable valve.

This diagnostic apparatus is advantageous because it offers a significant shortening of the overall time required to test a milking point of a milking apparatus, e.g. with respect to its fluid tightness, vacuum levels and/or flow capacity. Namely, the proposed diagnostic apparatus enables a service technician to attach all the teatcups to the test tubes. Then, the diagnostic apparatus may execute a fully automatic test procedure, which involves individual testing of all teatcups without any further manual intervention from the service technician being required.

According to a preferred embodiment of this aspect of the invention, at least one of the sensors is represented by pressure meter that is arranged on a fluid conduit connected to the controllable valve. The pressure meter is configured to measure a vacuum pressure level related to each teatcup in the set of teatcups while the external vacuum pressure is applied on the milk-line side of the controllable valve. Thereby, the system vacuum level and a so-called release vacuum level can be measured in a convenient manner.

Further preferably, a set of pressure meters are included, each of which is arranged on a respective fluid conduit connected to the controllable valve; and is configured to measure a respective vacuum pressure level related to a particular teatcup. This enables additional improvement of the testing efficiency.

According to another preferred embodiment of this aspect of the invention, at least one of the at least one sensor is represented by an airflow meter that is configured to measure a flow value associated with each teatcup. The airflow meter is arranged on the side opposite to the milk-line side relative to the controllable valve, and is further connected to the controllable valve. In response to the control signal, the controllable valve is configured to selectively connect a particular one of the test tubes with the at least one airflow meter while the teatcups are simultaneously attached to the test tubes, and while the particular one of the test tubes is connected to the airflow meter and the external pressure is applied downstream of the at least one airflow meter relative to the controllable valve, the airflow meter measures a flow value. Hence, it can for example be tested whether or not an adequate air flow can be maintained without excessive pressure drop. It can also be determined if there are any leakages in the system.

Further preferably, a set of airflow meters are included each of which is configured to measure a respective flow value associated with a particular teatcup; and is connected to the controllable valve, however is arranged on the side opposite to the milk-line side relative to the controllable valve. In response to the control signal, the controllable valve is here configured to selectively connect a particular one of the test tubes with a particular one of the airflow meters while the teatcups are simultaneously attached to the test tubes. Then, while the particular one of the test tubes is connected to the particular airflow meter and the external pressure is applied downstream of the at least one airflow meter relative to the controllable valve, a flow value is measured. This enables yet an additional improvement of the testing efficiency.

According to still another preferred embodiment of this aspect of the invention, each test tube has an overall cylindrical shape and contains an internal cavity extending through the test tube from a base end to a tip end thereof. The tip end is configured to be introduced into a teatcup and the base end is connected to a main body of the diagnostic apparatus, which base end is further connected to a respective vacuum conduit in the diagnostic apparatus. Thereby, the test tubes are suited for introduction into the teatcups analogous to the teats of an animal, and can test various parameters of the milking point while thus connected.

According to a further preferred embodiment of this aspect of the invention, each test tube is associated with a respective orifice that is controllable between an open state and a closed state. The orifice is arranged at the base end of the test tube, and in the open state, is configured to allow a well-defined airflow into a teatcup that is connected to the test tube while the external vacuum pressure is applied on the milk-line side of the controllable valve. Consequently, the milking point's behavior in response to a controlled air admission can be tested.

According to yet another preferred embodiment of this aspect of the invention, the diagnostic apparatus contains an airflow nipple that is configured to be attached to an external vacuum supply so as to apply the external pressure on the side opposite to the milk-line side relative to the controllable valve. Thereby, for example the system vacuum pressure and/or release vacuum pressure of the milking machine can be conveniently utilized to perform various tests.

Preferably, the airflow nipple is connected to the test tubes via the at least one airflow meter and the controllable valve. Namely, this enables uncomplicated testing if there is any undesired air admission, i.e. leakages in the milking point.

According to another aspect of the invention, the object is achieved by the method described initially, wherein the method further involves:

attaching each teatcup in the set of teatcups to a respective test tube of a diagnostic apparatus; and controlling, via a controllable valve in the diagnostic apparatus, each of the test tubes to be selectively arranged for measurement of the at least one fluid-transport related parameter by means of at least one sensor in the diagnostic apparatus while the teatcups are simultaneously attached to the test tubes and an external vacuum pressure is applied either on a milk-line side of the controllable valve or on a side opposite to the milk-line side relative to the controllable valve.

The advantages of this method, as well as the preferred embodiments thereof, are apparent from the discussion above with reference to the proposed diagnostic apparatus.

According to a further aspect of the invention the object is achieved by a computer program loadable into the memory of at least one processor, and includes software adapted to implement the method proposed above when said program is run on at least one processor.

According to another aspect of the invention the object is achieved by a processor-readable medium, having a program recorded thereon, where the program is to control at least one processor to perform the method proposed above when the program is loaded into the at least one processor.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

DESCRIPTION OF PREFERRED EMBODIMENTS OF THE INVENTION

Figure 1:
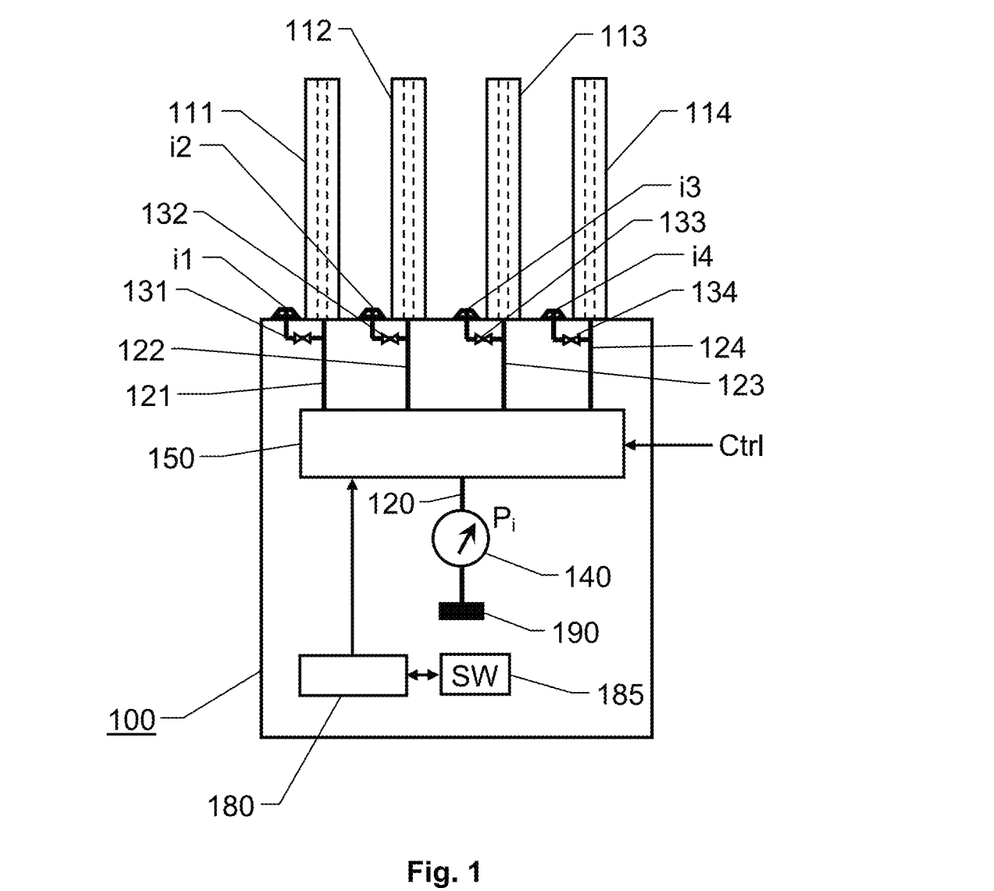
FIG. 1 shows a diagnostic apparatus according to a first embodiment of the invention.
Figure 4:
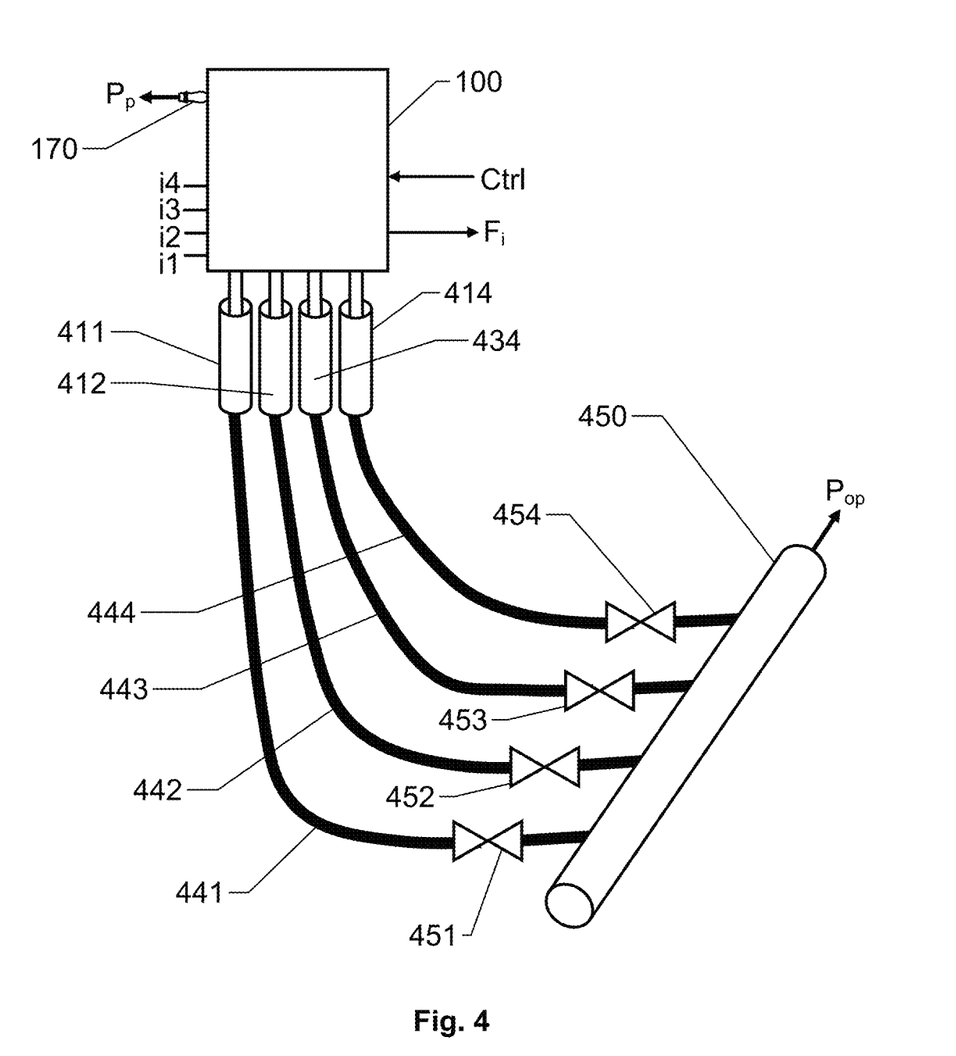
FIG. 4 illustrates how the teatcups of a milking point may be tested via the proposed diagnostic apparatus.

In FIG. 1, we see a diagnostic apparatus 100 according to a first embodiment of the invention for testing a milking point of a milking machine. FIG. 4 illustrates how a set of teatcups may be attached to and tested via the diagnostic apparatus 100.

Preferably, the number of test tubes in the set of test tubes matches the number of teatcups in each milking point of the milking machine to be tested. I.e., if there are four teatcups in each milking point, the diagnostic apparatus 100 has four test tubes; if there are two teatcups in each milking point, the diagnostic apparatus 100 has two test tubes, and so on. Namely, each test tube 111, 112, 113 and 114 is configured to be attached to one teatcup 411, 412, 413 and 414 in the set of teatcups in the milking point.

The diagnostic apparatus 100 includes at least one sensor, which here is represented by a pressure meter 140. The sensor 140 is configured to measure at least one fluid-transport related parameter, here in the form of a pressure level R. As will be discussed with reference to FIGS. 2 and 3, the diagnostic apparatus 100 may alternatively, or additionally, include other sensors for measuring other fluid-transport related parameters.

Each of the test tubes 111, 112, 113 and 114 has an overall cylindrical shape so as to imitate a generic teat, and thus allow a teatcup to fit and be attached thereto. Each test tube 111, 112, 113 and 114 further has an internal cavity that extends through the test tube from a base end to a tip end thereof. The tip end is configured to be introduced into a teatcup, and the base end is connected to a main body of the diagnostic apparatus 100. The base end is further connected to a respective fluid conduit 121, 122, 123 and 124 in the diagnostic apparatus.

A controllable valve 150 is connected to each of the test tubes 111, 112, 113 and 114 via a particular one of the fluid conduits 121, 122, 123 and 124. The controllable valve 150 is also connected to the pressure meter 140. In response to a control signal Ctrl, the controllable valve 150 is configured to selectively arrange a particular one of the test tubes 111, 112, 113 or 114 for measurement of a pressure level $P_i$ associated with the teatcup 411, 412, 413 or 414 attached to that test tube by means of the pressure meter 140. These measurements are made while all the teatcups 411, 412, 413 and 414 are simultaneously attached to the test tubes 111, 112, 113 and 114 and an external vacuum pressure is applied. In this embodiment of the invention, the external vacuum pressure $P_{op}$ is applied on a milk-line side of the controllable valve 150, i.e. via the teatcups 411, 412, 413 and 414 that are attached to the test tubes 111, 112, 113 and 114. The opposite side of the pressure meter 140, in turn, is connected to an air tight stop plug 190.

Consequently, the control signal Ctrl causes the controllable valve 150 to be set such that a particular test tube, say 111 and the teatcup attached thereto, say 411, is connected to the pressure meter 140 so that an associated pressure value $P_i$ can be registered.

Thereafter, a different control signal Ctrl is received, which causes the controllable valve 150 to connect another test tube, say 112 and the teatcup attached thereto, say 412, to the pressure meter 140, and so on, until a pressure value $P_i$ has been registered for each of the teatcups 411, 412, 413 and 414. During the entire measurement procedure, the teatcups 411, 412, 413 and 414 remain attached to the test tubes 111, 112, 113 and 114 and the external vacuum pressure $P_{op}$ is applied.

Preferably, each of the test tubes 111, 112, 113 and 114 is further associated with a respective orifice i1, i2, i3 and i4, which is controllable between an open state and a closed state via a respective valve 131, 132, 133 and 134. The orifice is arranged at the base end of the test tube and is configured to, in the open state, allow a well-defined airflow into a teatcup that is connected to the test tube while the external vacuum pressure $P_{op}$ is applied on the milk-line side of the controllable valve 150. Thus, by selectively opening orifices i1, i2, i3 and i4 and checking the pressure meter 140, it can be tested whether or not the vacuum pressure remains at an acceptable level. Namely, in normal operation of the milking machine, a certain airflow is needed to enable extracted milk to be transported from the teatcups 411, 412, 413 and 414 to the milk line 250. For example, an airflow of 75 liter per minute via one of orifice i1, i2, i3 and i4 should at most result in a pressure drop of 5 kPa.

Figure 2:
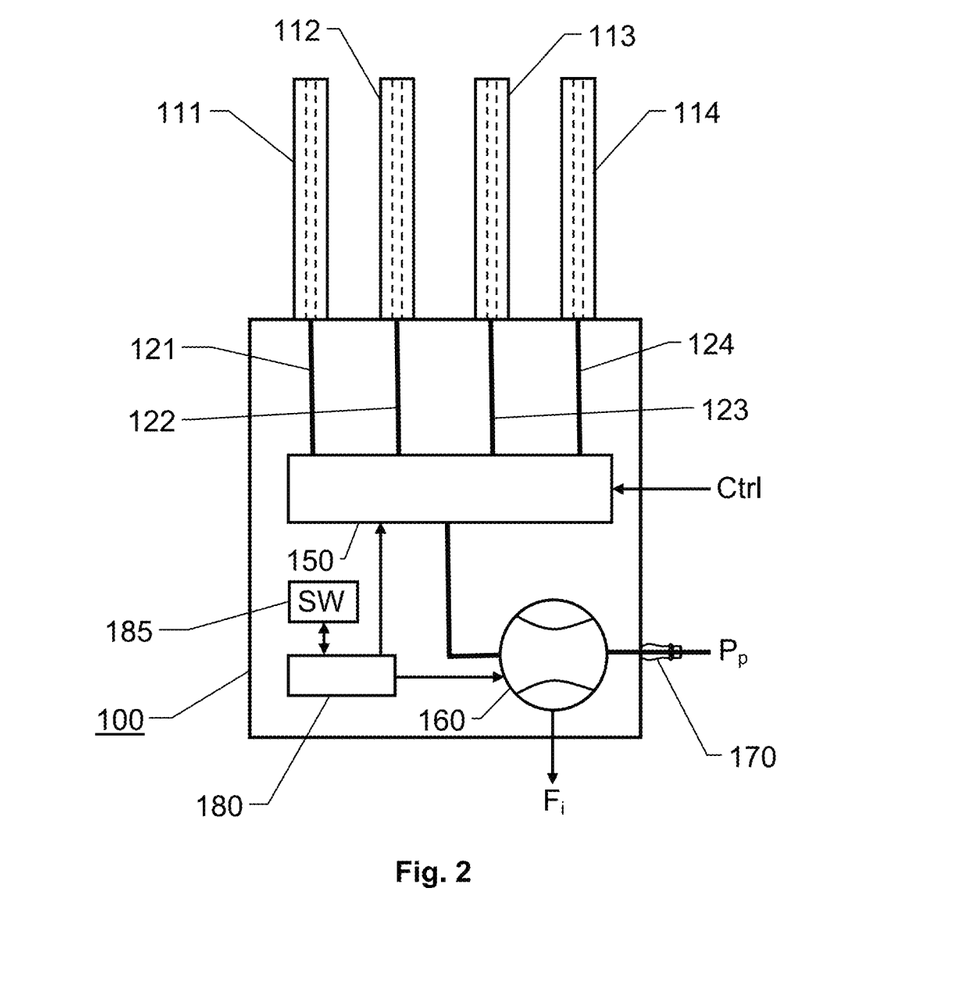
FIG. 2 shows a diagnostic apparatus according to a second embodiment of the invention.

FIG. 2 shows an alternative embodiment to the single-pressure meter embodiment shown of FIG. 1. In FIG. 2, the diagnostic apparatus 100 instead contains an airflow meter 160 that is configured to measure the fluid-transport related parameter in the form of a flow value $F_i$.

All elements, units and signals in FIG. 2 that also appear in FIG. 1 are the same elements, units and signals as described above with reference to FIG. 1.

The airflow meter 160 is configured to measure a flow value $F_i$ associated with each teatcup in the set of teatcups 411, 412, 413 and 414 respectively. To this aim, the airflow meter 160 is arranged on the side opposite to the milk-line side relative to the controllable valve 150. The airflow meter 160 is connected between the controllable valve 150 and an airflow nipple 170. The airflow nipple 170, in turn, is configured to be attached to an external vacuum supply so as to apply the external pressure $P_p$ on the side opposite to the milk-line side relative to the controllable valve 150.

Such an arrangement is desirable when checking the system for leakages, i.e. investigating if there is any unwanted air admission. First, the milking point's connection to the milk line 450 is cut off, for example via valves 451, 452, 453 and 454 on conduits 441, 442, 443 and 444 connecting the teatcups with the milk line 450, or by other mechanical means e.g. clamps. Then, the external pressure $P_p$ is applied via the airflow nipple 170. Thereafter, the control signal Ctrl controls the controllable valve 150 such that a particular one of the test tubes 111, 112, 113 and 114 is selectively connected to the airflow meter 160, and an associated flow value $F_i$ is registered. Hence, if there are no leakages, the registered flow values $F_i$ shall all be within a prescribed interval. Normally, an air inlet is arranged in proximity to where conduits 441, 442, 443 and 444 are connected to the teatcups 411, 412, 413 and 414 respectively. Further testing can then be performed, which involves covering and uncovering these air inlets, and studying how this influences the registered flow values $F_i$.

Figure 3:
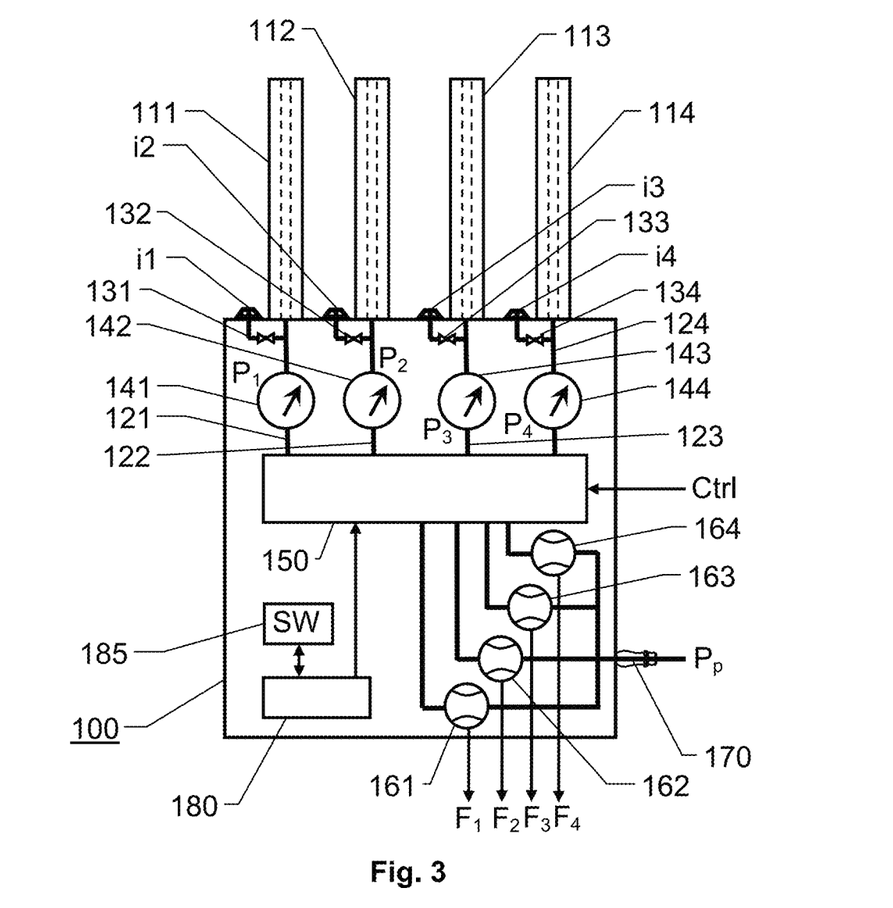
FIG. 3 shows a diagnostic apparatus according to a third embodiment of the invention.

FIG. 3 shows a diagnostic apparatus according to yet another embodiment of the invention. Here, all elements, units and signals that also appear in FIGS. 1 and/or 2 are the same elements, units and signals as described above with reference to these figures.

In FIG. 3, the diagnostic apparatus 100 contains a set of pressure meters 141, 142, 143 and 144, which are arranged on a respective fluid conduit 121, 122, 123 and 124 that each is connected to the controllable valve 150. The pressure meters 141, 142, 143 and 144 are configured to measure a respective vacuum pressure level $P_1$, $P_2$, $P_3$ and $P_4$ related to each of the teatcups 411, 412, 413 and 414 when these are attached to the test tubes 111, 112, 113 and 114, and while the external vacuum pressure $P_{op}$ is applied on the milk-line side of the controllable valve 150.

Analogous to the above, the controllable valve 150 is configured to, in response to the control signal Ctrl, selectively arrange a particular one of the test tubes 111, 112, 113 or 114 for measurement of at least one fluid-transport related parameter. Thus, if for example all passages from the fluid conduit 121, 122, 123 and 124 are cut off at the controllable valve 150, a system vacuum level $P_1$, $P_2$, $P_3$ and $P_4$ associated with each teatcup 411, 412, 413 and 414 can be measured via the pressure meters 141, 142, 143 and 144 while the teatcups are simultaneously attached to the test tubes and an external vacuum pressure $P_{op}$ is applied on the milk-line side of the controllable valve 150.

The above test is preferably repeated with an applied release vacuum, i.e. a somewhat lower pressure (e.g. around 14 kPa) used in normal operation of the milking machine when releasing a teatcup from an animal's teat after a completed milking session.

In FIG. 3, the diagnostic apparatus 100 further contains a set of airflow meters 161, 162, 163 and 164 that are configured to measure a respective flow value $F_1$, $F_2$, $F_3$ and $F_4$ associated with each of the teatcups 411, 412, 413 and 414. The airflow meters 161, 162, 163 and 164 are arranged on the side opposite to the milk-line side relative to the controllable valve 150, and each airflow meter is connected to the controllable valve 150. Hence, also with respect to the airflow meters 161, 162, 163 and 164, the controllable valve 150 is configured to, in response to the control signal Ctrl, selectively arrange a particular one of the test tubes 111, 112, 113 and 114 for of a fluid-transport related parameter. Analogous to the embodiment shown in FIG. 2, such measurements are performed while the teatcups 411, 412, 413 and 414 are simultaneously attached to the test tubes, however cut off from the milk line 250 (e.g. by valves 451, 452, 453 and 454, or clamps on the conduits 441, 442, 443 and 444 respectively), an external pressure $P_p$ is applied downstream of the at least one airflow meter relative to the controllable valve 150 via the airflow nipple 170, and a particular one of the test tubes, say 111, is connected to the particular airflow meter, say 161.

Additionally, in this setting, it can be checked if there are any leakages in the conduits 441, 442, 443 and 444, for example by applying the external pressure $P_p$ via the airflow nipple 170, closing the orifices i1, i2, i3 and i4, selectively connecting test tubes 111, 112, 113 and 114 to the flow meters 161, 162, 163 and 164, and registering an associated flow value $F_1$, $F_2$, $F_3$ and $F_4$ respectively aiming at identifying any undesired intake of air, i.e. leakages. As mentioned above, this may involve covering and uncovering air inlets in proximity to where conduits 441, 442, 443 and 444 are connected to the teatcups 411, 412, 413 and 414 respectively.

In all the above-described embodiments, the control signal Ctrl is preferably generated automatically, for instance by an executing computer program. However, the control signal Ctrl may equally well be generated as the result of an operator manipulating an input means (e.g. a key or a button). In any case, the diagnostic apparatus 100 preferably contains a data processing unit 180 that is communicatively connected to a memory unit 185 storing a computer program product, which, in turn, contains software SW for making at least one processor in the data processing unit 180 execute the above-described actions when the computer program product SW is run on the at least one processor.

Moreover, although three different embodiments have been described which represent specific combinations of a number of pressure meters on the milk-line side of the controllable valve 150 and a number of flow meters on the side opposite to the milk-line side relative to the controllable valve, the invention also encompasses further combinations, e.g. a single pressure meter (cf. 140 in FIG. 1) combined with a set of flow meters (cf. 161, 162, 163 and 164 in FIG. 3); and a set of pressure meters (cf. 141, 142, 143 and 144 in FIG. 3) combined with a single flow meter (cf. 160 in FIG. 2). Naturally, controllable orifices i1, i2, i3 and i4 may or may not be included in either of these combinations.

Figure 5:
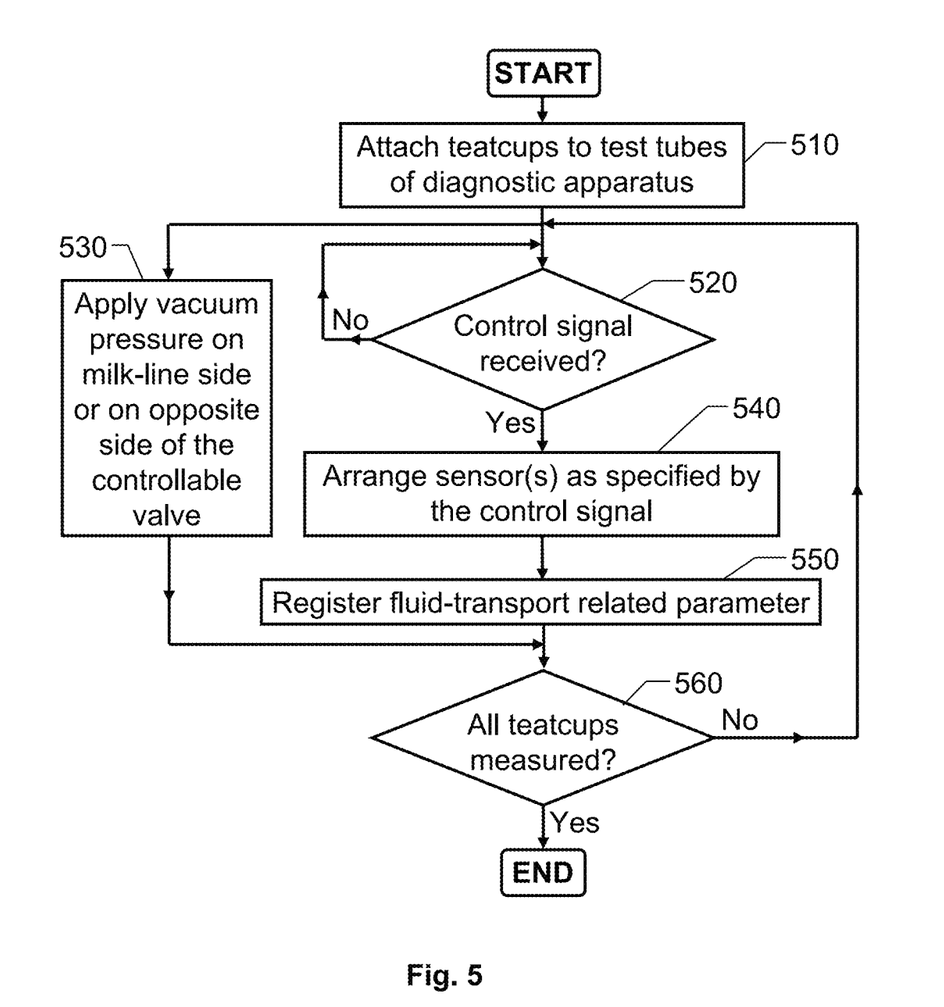
FIG. 5 illustrates, by means of a flow diagram, the general method according to the invention.

In order to sum up, and with reference to the flow diagram in FIG. 5, we will now describe the general method according to the invention for testing a milking point of a milking machine by means of the proposed diagnostic apparatus. We assume that the milking point has a set of teatcups, say four, each of which is connected to a milk line of the milking machine.

In a first step 510, the teatcups are attached to a respective test tube of a diagnostic apparatus.

Then, a step 520 checks if a control signal has been received, and if so, a step 540 follows. Otherwise, the procedure loops back and stays in step 520.

In parallel with step 520, in a step 530, a vacuum pressure is applied either on a milk-line side of the controllable valve, or on a side opposite to the milk-line side. The vacuum pressure applied continues to be applied until steps 540 and 550 subsequent to step 520 have been executed.

In step 540, the controllable valve is set in accordance with the control signal. This, in turn, means that the test tubes are selectively arranged for measurement of at least one fluid-transport related parameter (e.g. a pressure level or a low value) by means of at least one sensor (e.g. a pressure meter or flow sensor) while all the teatcups are simultaneously attached to the test tubes.

After having arranged the test tubes for measurement of a particular fluid-transport related parameter, this parameter is measured and registered in a step 550, and then a step 560 follows.

Step 560 checks if all teatcups of the milking points have been measured with respect to all fluid-transport related parameters, and if so the procedure ends. Otherwise, the procedure loops back to steps 520 and 530 for continued testing.

In practice, this typically means that a different control signal is received in step 520; and thereafter, the controllable valve is set differently to arrange the test tubes for measurement another measurement, either with respect to the teatcup to be tested, or with respect to the fluid-transport related parameter to be measured.

All of the process steps, as well as any sub-sequence of steps, described with reference to FIG. 5 above may be controlled by means of a programmed processor. Moreover, although the embodiments of the invention described above with reference to the drawings comprise processor and processes performed in at least one processor, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application.

The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

Although the invention is advantageous in connection with cow milking, the invention is equally well adapted for implementation in milking machines for any other kind of mammals, such as goats, sheep or buffaloes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. A diagnostic apparatus (100) for testing a milking point of a milking machine, the diagnostic apparatus (100) comprising:
   at least one sensor (140, 141, 142, 143, 144, 160, 161, 162, 163, 164) configured to measure at least one fluid-transport related parameter ($P_i$, $P_1$, $P_2$, $P_3$, $P_4$, $F_i$, $F_1$, $F_2$, $F_3$, $F_4$) of the milking point, the milking point comprising a set of teatcups (411, 412, 413, 414), each teatcup being connected (441, 442, 443, 444) to a milk line (450) of the milking machine;
   a set of test tubes (111, 112, 113, 114), wherein each test tube is configured to be attached to a respective one teatcup in the set of teatcups (411, 412, 413, 414) such that each test tube is connected to a different one of the teatcups in the set of teatcups (411, 412, 413, 414); and
   a controllable valve (150) connected to each of the test tubes (111, 112, 113, 114), the controllable valve (150) being configured to, in response to a control signal (Ctrl), selectively arrange a particular one of the test tubes for measurement of the at least one fluid-transport related parameter by the at least one sensor while the teatcups are simultaneously attached to the test tubes and an external vacuum pressure ($P_{op}$, $P_p$) is applied either on a milk-line side of the controllable valve (150) or on a side opposite to the milk-line side relative to the controllable valve (150).

2. The diagnostic apparatus (100) according to claim 1, wherein,
   the at least one sensor comprises at least one pressure meter (140, 141, 142, 143, 144) arranged on at least one fluid conduit (120, 121, 122, 123, 124) connected to the controllable valve (150), and
   the at least one pressure meter being configured to measure a vacuum pressure level ($P_i$, $P_1$, $P_2$, $P_3$, $P_4$, related to each teatcup in the set of teatcups while the external vacuum pressure ($P_{op}$) is applied on the milk-line side of the controllable valve (150).

3. The diagnostic apparatus (100) according to claim 2, wherein,
the at least one pressure meter (140, 141, 142, 143, 144) comprises a set of pressure meters (141, 142, 143, 144),
the at least one fluid conduit (121, 122, 123, 124) comprises a set of fluid conduits (121, 122, 123, 124) connected to the controllable valve (150),
each pressure meter of the set of pressure meters is arranged on a respective one fluid conduit (121, 122, 123, 124) of the set of fluid conduits (121, 122, 123, 124), and
each pressure meter is configured to measure a respective vacuum pressure level ($P_1$, $P_2$, $P_3$, $P_4$) related to each teatcup in the set of teatcups while the external vacuum pressure ($P_{op}$) is applied on the milk-line side of the controllable valve (150).

4. The diagnostic apparatus (100) according to claim 1, wherein,
the at least one sensor comprises at least one airflow meter (160, 161, 162, 163, 164) configured to measure a flow value ($F_i$, $F_1$, $F_2$, $F_3$, $F_4$) associated with each teatcup in the set of teatcups (411, 412, 413, 414), and
the at least one airflow meter is arranged on the side opposite to the milk-line side relative to the controllable valve (150) and is connected to the controllable valve (150), the controllable valve (150) being configured to, in response to the control signal (Ctrl), selectively connect a particular one of the test tubes with the at least one airflow meter (160, 161, 162, 163, 164) while the teatcups are simultaneously attached to the test tubes, while the particular one of the test tubes is connected to the airflow meter and the external pressure ($P_p$) is applied downstream of the at least one airflow meter relative to the controllable valve (150).

5. The diagnostic apparatus (100) according to claim 4, wherein,
the at least one airflow meter comprises a set of airflow meters (161, 162, 163, 164) configured to measure a respective flow value ($F_1$, $F_2$, $F_3$, $F_4$) associated with each teatcup in the set of teatcups (411, 412, 413, 414), and
the airflow meters are arranged on the side opposite to the milk-line side relative to the controllable valve (150) and is each connected to the controllable valve (150), the controllable valve (150) being configured to, in response to the control signal (Ctrl), selectively connect a particular one of the test tubes with a particular one of the airflow meters (161, 162, 163, 164) while the teatcups are simultaneously attached to the test tubes, while the particular one of the test tubes is connected to the particular airflow meter and the external pressure ($P_p$) is applied downstream of the at least one airflow meter relative to the controllable valve (150).

6. The diagnostic apparatus (100) according to claim 1, wherein each test tube in the set of test tubes (111, 112, 113, 114) has an overall cylindrical shape and comprises an internal cavity extending through the test tube from a base end to a tip end thereof, wherein the tip end is configured to be introduced into a teatcup and the base end is connected to a main body of the diagnostic apparatus, the base end being further connected to a respective vacuum conduit (121, 122, 123, 124) in the diagnostic apparatus.

7. The diagnostic apparatus (100) according to claim 6, further comprising a set of orifices (i1, i2, i3, i4) controllable between an open state and a closed state,
wherein each test tube in the set of test tubes (111, 112, 113, 114) is connected to a respective one orifice of the set of orifices (i1, i2, i3, i4), and
each orifice is arranged at the base end of one of the test tubes and is configured to, in the open state, allow a defined airflow into a teatcup that is connected to the test tube while the external vacuum pressure ($P_{op}$) is applied on the milk-line side of the controllable valve (150).

8. The diagnostic apparatus (100) according to claim 4, further comprising an airflow nipple (170) attachable to an external vacuum supply to apply the external pressure ($P_p$) on the side opposite to the milk-line side relative to the controllable valve (150).

9. The diagnostic apparatus (100) according to claim 8, wherein the airflow nipple (170) is connected to the test tubes (111, 112, 113, 114) via the at least one airflow meter (160, 161, 162, 163) and the controllable valve (150).

10. A method of testing a milking point of a milking machine, the milking point comprising a set of teatcups (411, 412, 413, 414), each teatcup being connected to a milk line (450) of the milking machine, the method comprising:
attaching each teatcup in the set of teatcups (211, 212, 213, 214) to a respective test tube (111, 112, 113, 114) of a diagnostic apparatus (100); and
controlling (Ctrl), via a controllable valve (150) in the diagnostic apparatus (100), each of the test tubes (111, 112, 113, 114) to be selectively arranged for measurement of the at least one fluid-transport related parameter ($P_i$, $P_1$, $P_2$, $P_3$, $P_4$, $F_i$, $F_1$, $F_2$, $F_3$, $F_4$) by at least one sensor (140, 141, 142, 143, 144, 160, 161, 162, 163, 164) in the diagnostic apparatus while the teatcups are simultaneously attached to the test tubes and an external vacuum pressure ($P_{op}$, $P_p$) is applied either on a milk-line side of the controllable valve (150) or on a side opposite to the milk-line side relative to the controllable valve (150).

11. The method according to claim 10, wherein the at least one sensor comprises at least one pressure meter (140, 141, 142, 143, 144) arranged on a fluid conduit (120, 121, 122, 123, 124) connected to the controllable valve (150) and method further comprises:
measuring, via the at least one pressure meter (140, 141, 142, 143, 144), a respective vacuum pressure level related to each teatcup in the set of teatcups (411, 412, 413, 414) while the external vacuum pressure ($P_{op}$) is applied on the milk-line side of the controllable valve (150).

12. The method according to claim 10, wherein the at least one sensor comprises at least one airflow meter (160, 161, 162, 163, 164) arranged on the side opposite to the milk-line side relative to the controllable valve (150) and connected to the controllable valve (150), and the method further comprises:
cutting off (451, 452, 453, 454) a fluid connection (441, 442, 443, 444) between the teatcups (411, 412, 413, 414) in the set of teatcups and the milk line (450);
applying the external vacuum pressure ($P_p$) on the side opposite to the milk-line side relative to the controllable valve (150); and
selectively connecting a particular one of the test tubes with the at least one airflow meter (160, 161, 162, 163, 164) in the diagnostic apparatus while the teatcups are simultaneously attached to the test tubes and while the external vacuum pressure ($P_p$) is applied on the side opposite to the milk-line side relative to the controllable valve (150) to measure a respective flow value ($F_i$, $F_1$, $F_2$, $F_3$, $F_4$) associated with each teatcup in the set of teatcups (411, 412, 413, 414) while the particular one of the test tubes is connected to the airflow meter and the external pressure ($P_p$) is applied downstream of the airflow meter relative to the controllable valve (150).

13. The method according to claim 10, further comprising:
    allowing a defined airflow into a particular teatcup in the set of teatcups, the particular teatcup being connected to a test tube of said test tubes while the external vacuum pressure ($P_{op}$) is applied on the milk-line side of the controllable valve (150), and while the defined airflow is allowed into the particular teatcup; and
    measuring a pressure level ($P_i$, $P_1$, $P_2$, $P_3$, $P_4$) associated with the particular teatcup.

14. A non-transitory processor-readable medium (185), having a program comprised of program code recorded thereon, wherein when the program is executed one at least one processor (180) of the diagnostic apparatus (100), the program code causes the diagnostic apparatus (100) to perform the method of claim 10.

15. The method according to claim 10, wherein, in controlling (Ctrl) each of the test tubes to be selectively arranged for measurement of the at least one fluid-transport related parameter by the at least one sensor in the diagnostic apparatus while the teatcups are simultaneously attached to the test tubes and the external vacuum pressure ($P_{op}$, $P_p$) is applied the milk-line side of the controllable valve (150).

16. The method according to claim 10, wherein, in controlling (Ctrl) each of the test tubes to be selectively arranged for measurement of the at least one fluid-transport related parameter by the at least one sensor in the diagnostic apparatus while the teatcups are simultaneously attached to the test tubes and the external vacuum pressure ($P_{op}$, $P_p$) is applied on the side opposite to the milk-line side relative to the controllable valve (150).

17. The method according to claim 11, wherein the at least one sensor comprises at least one airflow meter (160, 161, 162, 163, 164) arranged on the side opposite to the milk-line side relative to the controllable valve (150) and connected to the controllable valve (150), and the method further comprises:
    cutting off (451, 452, 453, 454) a fluid connection (441, 442, 443, 444) between the teatcups (411, 412, 413, 414) in the set of teatcups and the milk line (450);
    applying the external vacuum pressure ($P_p$) on the side opposite to the milk-line side relative to the controllable valve (150); and
    selectively connecting a particular one of the test tubes with the at least one airflow meter (160, 161, 162, 163, 164) in the diagnostic apparatus while the teatcups are simultaneously attached to the test tubes and while the external vacuum pressure ($P_p$) is applied on the side opposite to the milk-line side relative to the controllable valve (150) to measure a respective flow value ($F_i$, $F_1$, $F_2$, $F_3$, $F_4$) associated with each teatcup in the set of teatcups (411, 412, 413, 414) while the particular one of the test tubes is connected to the airflow meter and the external pressure ($P_p$) is applied downstream of the airflow meter relative to the controllable valve (150).

18. The method according to claim 11, further comprising:
    allowing a defined airflow into a particular teatcup in the set of teatcups, the particular teatcup being connected to a test tube of said test tubes while the external vacuum pressure ($P_{op}$) is applied on the milk-line side of the controllable valve (150), and while the defined airflow is allowed into the particular teatcup; and
    measuring a pressure level ($P_i$, $P_1$, $P_2$, $P_3$, $P_4$) associated with the particular teatcup.

19. The method according to claim 12, further comprising:
    allowing a defined airflow into a particular teatcup in the set of teatcups, the particular teatcup being connected to a test tube of said test tubes while the external vacuum pressure ($P_{op}$) is applied on the milk-line side of the controllable valve (150), and while the defined airflow is allowed into the particular teatcup; and
    measuring a pressure level ($P_i$, $P_1$, $P_2$, $P_3$, $P_4$) associated with the particular teatcup.

20. The diagnostic apparatus (100) according to claim 3, wherein,
    the at least one sensor further comprises at least one airflow meter (160, 161, 162, 163, 164) configured to measure a flow value ($F_i$, $F_1$, $F_2$, $F_3$, $F_4$) associated with each teatcup in the set of teatcups (411, 412, 413, 414), and
    the at least one airflow meter is arranged on the side opposite to the milk-line side relative to the controllable valve (150) and is connected to the controllable valve (150), the controllable valve (150) being configured to, in response to the control signal (Ctrl), selectively connect a particular one of the test tubes with the at least one airflow meter (160, 161, 162, 163, 164) while the teatcups are simultaneously attached to the test tubes, while the particular one of the test tubes is connected to the airflow meter and the external pressure ($P_p$) is applied downstream of the at least one airflow meter relative to the controllable valve (150).

* * * * *